(12) United States Patent  
Carlson et al.

(10) Patent No.: US 8,192,507 B1
(45) Date of Patent: Jun. 5, 2012

(54) SUPERCRITICAL NOBLE GASES AND COLORING METHODS

(75) Inventors: William B. Carlson, Seattle, WA (US); Gregory D. Phelan, Cortland, NY (US); Philip A. Sullivan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/413,490

(22) Filed: Mar. 6, 2012

Related U.S. Application Data

(63) Continuation of application No. 13/002,272, filed as application No. PCT/US2010/044759 on Aug. 6, 2010, now Pat. No. 8,152,862.

(51) Int. Cl.
*D06P 1/94* (2006.01)
(52) U.S. Cl. .................. 8/475; 8/147; 8/149.1; 8/149.2
(58) Field of Classification Search .............. 8/475, 147, 8/149.1, 149.2
See application file for complete search history.

(56) References Cited

U.S. PATENT DOCUMENTS

| | | | |
|---|---|---|---|
| 5,698,644 A | 12/1997 | Hu et al. | |
| 6,048,369 A * | 4/2000 | Smith et al. | ........................ 8/475 |
| 6,471,327 B2 | 10/2002 | Jagannathan et al. | |
| 2003/0098517 A1 | 5/2003 | Ventosa Rull et al. | |
| 2004/0134515 A1 | 7/2004 | Castrucci | |
| 2004/0198622 A1 | 10/2004 | Korzenski et al. | |
| 2004/0224865 A1 | 11/2004 | Roeder et al. | |
| 2004/0266635 A1 | 12/2004 | Korzenski et al. | |
| 2005/0028927 A1 | 2/2005 | Basceri et al. | |
| 2005/0075436 A1 | 4/2005 | McHugh et al. | |
| 2005/0167841 A1 | 8/2005 | Papa Rao et al. | |
| 2006/0266235 A1 | 11/2006 | Sandhu et al. | |

FOREIGN PATENT DOCUMENTS

| | | |
|---|---|---|
| DE | 199 03 243 A1 | 8/2000 |
| EP | 1 844 850 A1 | 10/2007 |
| JP | 2003-209088 A | 7/2003 |
| RU | 2 223 654 C1 | 2/2004 |
| WO | 90/06189 A1 | 6/1990 |
| WO | 03/006563 A1 | 1/2003 |
| WO | 2005/042623 A1 | 5/2005 |

OTHER PUBLICATIONS

Henderson, M. et al., "Phase diagram and pV isotherms of argon", Journal of Chemical Physics, 1969, vol. 51, Issue 12, pp. 5420-5429.
Ancsin, J., "Phase changes in argon", Metrologia, 1973, vol. 9, No. 4, pp. 147-154.
Saija, Franz et al., "High-pressure phase diagram of the exp-6 model: The case of Xenon", Physical Review B: Condensed Matter and Materials Physics, 2005, vol. 72, Issue 2, pp. 024113/1-024113/10.

(Continued)

*Primary Examiner* — Eisa Elhilo
(74) *Attorney, Agent, or Firm* — Maschoff Gilmore & Israelsen

(57) ABSTRACT

Coloring compositions including, for example, a supercritical fluid comprising a noble gas in a supercritical state and a colorant within the supercritical fluid are disclosed. For example, the noble gas may be at least one of helium, argon, krypton, neon, xenon and radon. Methods of producing such compositions and methods of coloring an article with such composition are also disclosed.

20 Claims, 7 Drawing Sheets

OTHER PUBLICATIONS

Prager, M. et al., "Methane rotation and the phase diagram of methane/xenon", Journal of Chemical Physics, 1993, vol. 99, Issue 3, pp. 2052-2058.

Kim, Sunwook, et al., "Phase behaviors and fractionation of polymer solutions in supercritical carbon dioxide", Journal of Supercritical Fluids, 1998, vol. 13, Issue 1-3, pp. 99-106.

Goldfarb, Daria L., et al., "Dielectric and volumetric properties of supercritical carbon dioxide (1) + methanol(2) mixtures at 323.15 K", Fluid Phase Equilibria, Jun. 1999, vol. 158-160, pp. 1011-1019.

Wang, Joanna Shaofen et al., "Nuclear Laundry Using Supercritical Fluid Solutions", Industrial & Engineering Chemistry Research, 2004, vol. 43, Issue 7, pp. 1580-1585.

Li, Luxi et al., "CH3I low-n Rydberg states in supercritical atomic fluids near the critical point", Chemical Physics, Jun. 2009, vol. 360, Issue 1-3, pp. 7-12.

Fein, Jeremy B., et al., "Portlandite solubilities in supercritical argon-water mixtures: Implications for quantifying solvent effects", American Journal of Science, 1989, vol. 289, Issue 8, pp. 975-993.

Jonathan P. Blitz, et al., "Infrared spectroscopic studies of supercritical fluid solutions", Journal Physics Chemical, Sep. 1989, vol. 93, Issue 18, DOI: 10.1021/j100355a019, pp. 6661-6665.

Evans, C. M et al., "Field ionization of C2H5I in supercritical argon near the critical point", Journal of Physics B: Atomic, Molecular and Optical Physics, 2005, vol. 38, No. 16, pp. L269-L275.

Lazzaroni, M. J., et al., "High-pressure vapor-liquid equilibria of argon+ carbon dioxide+ 2− propanol", The Journal of Supercritical Fluids, Apr. 2006, vol. 37, Issue 2, pp. 135-141.

Luhring, P. et al., "Gas solubilities (hydrogen, helium, nitrogen, carbon monoxide, oxygen, argon, carbon dioxide) in organic liquids at 293.2 K", Journal Chemical Eng. Data, 1989, vol. 34, Issue 2, pp. 250-252.

Liu, Z.-T. et al., "New Process for Synthesizing Fluorinated Polymers in Supercritical Carbon Dioxide", Macromolecules, Sep. 18, 2008, vol. 41, Issue 19, pp. 6987-6992.

Hu, H. et al., "Synthesis of fluorocarbon-modified poly( acrylic acid) in supercritical carbon dioxide", Polymer, 2002, vol. 43, Issue 23, pp. 6357-6361.

Sha, Jing, et al., "Molecular glass resists developable in supercritical carbon dioxide for 193 nm lithography", Proceedings of SPIE, 2009, vol. 7273, (Pt. 2, Advances in Resist Materials and Processing Technology XXVI), 72732T/1-72732T/8.

van der Kraan, M. et al., "Dyeing of natural and synthetic textiles in supercritical carbon dioxide with disperse reactive dyes", Journal of Supercritical Fluids, Apr. 2007, vol. 40, Issue 3, pp. 470-476.

Fernandez Cid et al., "Acid-catalyzed methanolysis reaction of non-polar triazinyl reactive dyes in supercritical carbon dioxide", Journal of Supercritical Fluids, Jan. 2007, vol. 39, Issue 3, pp. 389-398.

Fernandez Cid, M. V, et al., "Kinetics study of a dichlorotriazine reactive dye in supercritical carbon dioxide", Journal of Supercritical Fluids, Dec. 2004, vol. 32, Issue 1-3, pp. 147-152.

Liang, S. et al., "Extraction of petroleum hydrocarbons from soil using supercritical argon", Analytical Chemistry, 1998, vol. 70, Issue 3, pp. 616-622.

\* cited by examiner

SUPERCRITICAL NOBLE GASES AND COLORING METHODS

CROSS-REFERENCE TO RELATED APPLICATION

This patent application is a continuation of U.S. patent application Ser. No. 13/002,272, filed on Dec. 30, 2010. Now a U.S. Pat. No. 8,152,862, which is a national stage of PCT international application no. PCT/US2010/044759, filed Aug. 6, 2010, which are incorporated herein by reference.

BACKGROUND

Traditional water-based coloring compositions that are used for dying, staining, or pigmenting an article of manufacture can result in a large volume of waste water. Often, the waste water can be contaminated with highly toxic chemicals that are byproducts from the coloring process and that can be difficult and expensive to separate from the water. However, the contaminated water should not be introduced back into the environment without removing the coloring, and as a result an expensive coloring process may be required.

Supercritical carbon dioxide has been used in coloring processes because it can dissolve or absorb the colorant for application to an article of manufacture. However, carbon dioxide can also react with various functional moieties on either the colorant or the article of manufacture, such as textiles, and impair the ability of the colorant to attach to the article of manufacture. As a result, the colorant is likely to be easily removed from the article, such as during cleaning, so that the color of the article dulls over time.

As such, there is a continued need for improved coloring compositions that can be used to provide color to articles of manufacture, such as textiles, polymer parts, metal parts, ceramic parts, or others.

SUMMARY

Technologies described herein relate generally to compositions for coloring an article. Such compositions may include, for example, a supercritical fluid comprising a noble gas in a supercritical state and a colorant within the supercritical fluid. For example the noble gas may be at least one of helium, argon, krypton, neon, xenon and radon.

Technologies described herein relate generally to methods of producing a coloring composition. Such methods may include forming a supercritical fluid by increasing at least one of a pressure and a temperature of a noble gas and combining a colorant with the supercritical fluid.

Technologies described herein relate generally to methods of coloring an article, which may include combining a colorant with a noble gas in a supercritical state to form a coloring composition and subjecting the article to the coloring composition to color the article.

DETAILED DESCRIPTION

Figure 1:
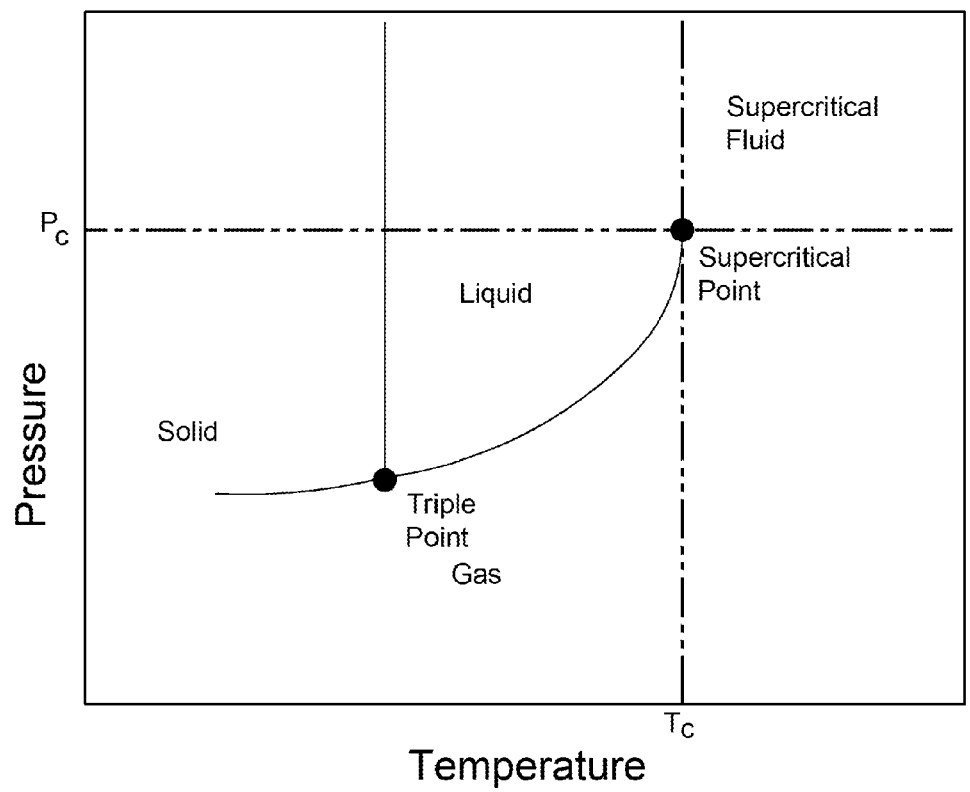
FIG. 1 is a schematic of a prior art and generic phase diagram showing, solid, liquid, gas, and supercritical fluid phases.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In view of the problems with coloring process byproducts being toxic or environmentally unfriendly, and being costly to prepare for disposal, it would be beneficial to have a new coloring composition that does not have these problems. It has now been found that a noble gas in the supercritical fluid state (e.g., supercritical noble gas) can be used as a non-toxic colorant composition that can dissolve, suspend, or absorb a colorant and apply a colorant to an article of manufacture. The use of a supercritical noble gas coloring composition has minimal to no harmful effects on the environment or on human health. Additionally, noble gases can be easily separated from the coloring process byproducts by converting the noble gas back to its gaseous state such that the byproducts from the coloring process remain as solids or liquid. The gaseous noble gas can then be removed from the liquid and solid byproducts by venting the gas out of a vessel that retains the liquid and solid. Evaporation of the noble gas may also be useful for removing the noble gas from the byproducts.

FIG. 1 is a schematic graph that generally represents the solid, liquid, gas, and supercritical fluid states. Noble gases can include helium, argon, krypton, neon, and xenon, or combinations thereof. However, radon may also be useful in some applications where radioactivity is not problematic, such as coloring a radioactive material. The noble gases are substantially inert, non-toxic, and are colorless and tasteless. The noble gases can be converted to supercritical fluids by compression to, or past, their supercritical point. The supercritical noble gases are useful as coloring compositions that provide coloring agents for coloring purposes, such as coloring various articles of manufacture composed of fiber, textile, polymer, glass, ceramic, metal, or combinations thereof.

A noble gas becomes a supercritical fluid noble gas at a temperature and pressure above its supercritical point. The supercritical point, as shown in FIG. 1, is a well-established phenomenon where a gas, such as a noble gas, converts to a supercritical fluid above the temperature (e.g., supercritical temperature) and pressure (e.g., supercritical pressure) of the supercritical point. As a supercritical fluid noble gas, it can diffuse through solids like a gas, and dissolve materials like a liquid. In addition, close to the supercritical point, small changes in pressure or temperature result in large changes in the density of the supercritical fluid, allowing many properties of a supercritical fluid noble gas to be "fine-tuned" to be more liquid like or more gas like. Relatively small decreases in temperature toward the supercritical point from temperatures near the supercritical can result in the supercritical fluid behaving closer to a fluid. Correspondingly, relatively small increases in the temperature away from supercritical point from temperatures near the supercritical can result in the supercritical fluid behaving closer to a gas. On the other hand, relatively small increases in pressure can increase the density of the supercritical fluid so that it behaves more like a liquid, whereas relatively small decreases in pressure reduce the density so that the supercritical fluid behaves more like a gas. In addition, there is no surface tension in a supercritical fluid, as there is no liquid/gas phase boundary.

Further, colorants are soluble in the noble gas supercritical fluid. Solubility in a supercritical fluid tends to increase with density of the fluid (at constant temperature). Since density increases with pressure, solubility tends to increase with pressure. At constant density, solubility will increase with temperature. However, close to the supercritical point, the density can drop sharply with a slight increase in temperature. Therefore, close to the supercritical temperature, solubility often drops with increasing temperature, and then rises again. These parameters can be modulated during coloring with a coloring agent suspended in the supercritical fluid to enhance coloring processes. For example, the solubility of the colorant in the supercritical fluid can be increased so that more colorant is dissolved and provided to the article to be colored. However, a dye with lower solubility in the supercritical fluid can be beneficial in some instances because it may be easier to control the amount of dye reacting with the article being colored with a dye with low solubility.

For example, these parameters can be modulated in order to achieve cavitation or the formation of bubbles on the surfaces of the vessel as well as on the article within the vessel. Cavitation can be induced by varying the pressure (e.g., reduce pressure until boiling occurs), by physical agitation, by application of ultrasound which induces localized cavitation upon the surface, and possibly by microwaves. The use of microwaves could greatly enhance and speed the dye-fabric bond formation process for some dye fabric combinations. Cavitation can increase the coloring potential of the solvent. Cavitation would normally nucleate at surface irregularities upon the item being colored or on the vessel walls.

All supercritical fluids are miscible with each other so, for a mixture, a single phase can be obtained if the supercritical point of the mixture is exceeded. The supercritical point of a binary mixture can be estimated as the arithmetic mean of the supercritical temperatures and pressures of the two components:

$$T_{c(mix)} = (\text{mole fraction } A) \times T_cA + (\text{mole fraction } B) \times T_cB.$$

For greater accuracy, the supercritical point can be calculated using equations of state, such as the Peng Robinson, or group contribution methods. Other properties, such as density, can also be calculated using equations of state. Tertiary, quaternary, or other multiple substance combinations are also possible. Experimental methods can be useful for determining the supercritical point of compositions that have multiple substances that are combined for preparing the supercritical fluid. Also, engineering handbooks can be used for looking up values for tertiary systems.

Many pressurized gases are actually supercritical fluids, and thereby can be useful in coloring processes with the supercritical noble gas. For example, nitrogen has a supercritical point of about 126.2K ($-147°$ C.) and about 3.4 MPa (34 bar or 33.56 atmospheres) and carbon dioxide ($CO_2$) has a supercritical point of about 31° C. and about 75 atmosphere. Therefore, nitrogen or $CO_2$ in a gas cylinder (e.g., an example of a storage vessel described below) above its respective supercritical point is a supercritical fluid and may be used in combination with a supercritical noble gas for coloring purposes.

The noble gases are a series of gases that have their valence of s2 (helium) or s2p6 (neon, argon, krypton, and xenon) completely filled, and as such are inert to chemical reactions. Argon constitutes about 1% of earth's atmosphere and as such is plentiful. The abundance of krypton in the atmosphere is thought to be about 0.000108-0.000114%, making it the seventh most common gas in the atmosphere. Xenon is a trace gas in Earth's atmosphere. Thus, there is a sufficient source of noble gases so that their use in coloring compositions can be cost effective even without considering the added benefit of improved personal safety and reduced environmental impact.

Supercritical noble gases are capable of dissolving, suspending, and/or absorbing a wide variety of colorants, such as but not limited to dyes, pigments, stains, or others. The supercritical noble gases have similar or better dissolving and/or absorbing parameters compared with $CO_2$. As such, supercritical noble gases can be used for providing a colorant to color articles of manufacture (e.g., textiles) equally as well, if not better than, supercritical $CO_2$. However, the noble gases offer distinct advantages as they are not carcinogens or mutagens, they do not destroy the ozone layer, they do not behave as greenhouse gases, they are volatile organic compound (VOC) compliant, and they have no known short or long term health consequences. Additionally, supercritical $CO_2$ can react with articles of manufacture and have a negative impact on the condition of the article, such as a textile, and lead to degradation of the article. Supercritical noble gases are substantially inert and do not have the same potential for reacting with and deteriorating an article being colored.

The colorant for coloring the article can be mixable or miscible with the supercritical noble gas. By being "mixable" or "miscible" it is meant that the colorant can be dissolvable, suspendable, absorbable, or otherwise capable of being partitioned into the supercritical noble gas through any other physical or chemical action or force.

Supercritical fluids of the noble gases, especially argon due to its abundance and availability to be obtained in a suitable purity, can be used as a carrier for a colorant at supercritical conditions. Argon has a supercritical temperature and pressure of about $-122°$ C. and about 50 atmospheres. Xenon has a supercritical point of about 17° C. and about 60 atmospheres. Helium has a supercritical point of about $-267.96°$ C. and about 2.24 atmospheres. Krypton has a supercritical point of about $-63.74°$ C. and about 54.28 atmospheres. Neon has a supercritical point of about $-228.75°$ C. and about 27.24 atmospheres. For comparison, the carbon dioxide supercritical pressure is about 75 atmospheres and supercritical temperature is about 31° C. Therefore, supercritical applications using carbon dioxide typically operate at temperatures between about 32 and about 49° C. and pressures between about 75 and about 250 atmospheres. At temperatures between about 32 and about 49° C., the operational pressure for argon would roughly be between about 350-500 atmospheres, which is easily obtainable by modern compression technology. Xenon would roughly be between about 75 and about 250 atmospheres.

Under these conditions, an article of manufacture can be colored with a colorant carried by a supercritical noble gas in less than about 30 minutes (e.g., about 1 minute to about 30 minutes), less than about 20 minutes (e.g., about 5 minutes to about 30 minutes), or even less than about 15 minutes (e.g., about 10 minutes to about 15 minutes), where about 12 minutes can be an example of a coloring time. Such supercritical noble gas can be used to color an article in a manner similar to coloring methods performed with supercritical carbon dioxide ($CO_2$) carrying a colorant under moderate pressure and temperature conditions that are easily obtainable with industrial heaters, compressors, and pressurizers.

In one embodiment, the colorant can be a dye. A dye is a molecule or chemical which absorbs light more at some visible wavelengths than at others. When a dye is added to a clear article, it can give clear colors that are transparent. In some instances the dye can result in a clear article being milky or translucent from the coloring. When a dye is added to an opaque medium such as concrete, the opacity remains, and some color is added. The net gray-equivalent brightness is always reduced, because a dye can absorb light.

The dye can be organic or inorganic, synthetic or natural. Organic dyes are well known, and many include reactive groups that can react with an article of manufacture, such as textile fibers, for providing a color fast article with color durability. For example, many dyes have certain reactive moieties, such as amino, carboxyl, or hydroxyl groups that can react with the article of manufacture to bond therewith. Some examples of organic dyes are provided below.

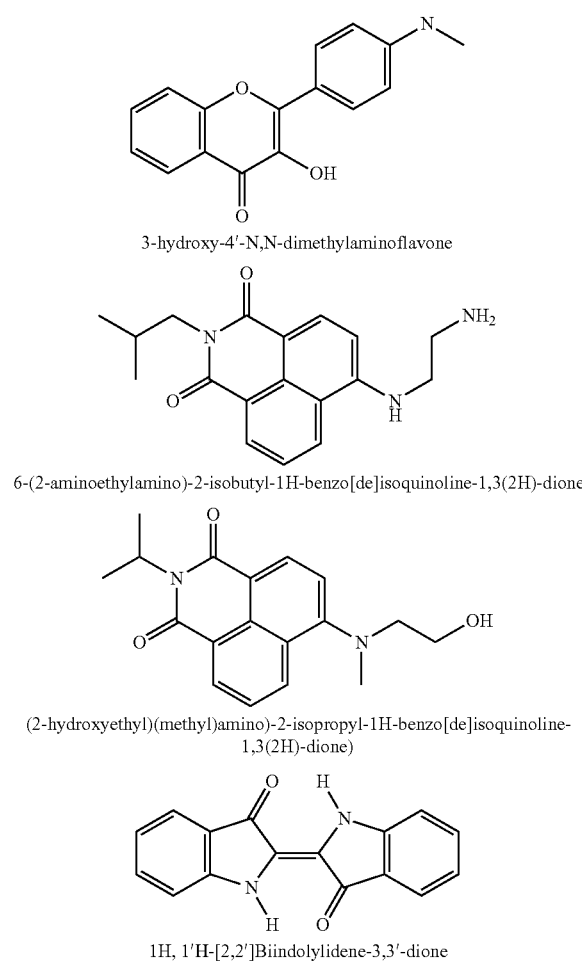

3-hydroxy-4'-N,N-dimethylaminoflavone 6-(2-aminoethylamino)-2-isobutyl-1H-benzo[de]isoquinoline-1,3(2H)-dione (2-hydroxyethyl)(methyl)amino)-2-isopropyl-1H-benzo[de]isoquinoline-1,3(2H)-dione)

1H, 1'H-[2,2']Biindolylidene-3,3'-dione

-continued

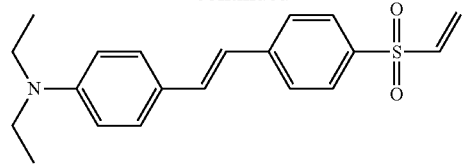

{4-[2-(4-Ethenesulfonyl-phenyl)-vinyl]-phenyl}-diethyl-amine

In one embodiment, the dye is a natural colorant, such as from a plant, animal, or insect product, and possibly from fungi or mushrooms. Some non-limiting examples of plant dyes can include: catechu (brown) which is from resin of acacia tree; fustic (yellow) which is from the wood of the fustic tree; henna (orange-red) which is from leaves of the henna plant; indigo (blue) which is from leaves and stems of the indigo plant; logwood (black) which is from the core (heart) of the logwood tree; madder (Turkey red) which is from the roots of the madder plant; quercitron (yellow) which is from the inner bark of the black oak tree; saffron (yellow) which is from stigmas of the common crocus; turmeric (violet) which is from roots of the turmeric plant; as well as others. Non-limiting examples of animal or insect dyes can include: cochineal (red) which is from bodies of cochineal insects; tyrian purple (purple or crimson) which is from the bodies of some types of marine snails; sepia (brown) which is from secretions of several types of cuttlefish; as well as others.

In one embodiment, the dye is an inorganic dye sometimes referred to as a mineral dye. Mineral dyes come from ocher (yellow, brown, red), limestone or lime (white), manganese (black), cinnabar and lead oxide (red), azurite and lapis lazuli (blue), and malachite (green). Some mineral dyes such as prussian blue, manganese bronze, chrome, antimony orange, or iron buff pigments can be fixed to fibers, such as cotton, by using heat and acid, which can be mixed with the supercritical noble gas. While some mineral colorants are termed "dyes," they may actually be pigments. Non-limiting examples of mineral dyes can include: chrome green which is from a compound of chromium and oxygen; chrome red which is from a compound of chromium and lead; chrome yellow which is from a compound of chromic acid and lead; prussian blue which is from a compound of iron and cyanide; or others.

In one embodiment, the colorant can be a pigment, which is meant to refer to a mixture or combination of a dye and an opacifying agent, such as white oxide powders, which scatter light, or dark colored powders, which both absorb and scatter light. Pigments are more opaque, and look more like paint. A white or light-colored pigment can sometimes make a dark medium lighter, provided the original medium was more translucent than the pigment. Silver or metallic colorants can be pigments.

In one embodiment, the colorant can be a stain, which tends to be a dye with selective uptake into an article being colored. For example, when the article of manufacture includes a wood product, the colorant can be a stain that stains the wood as the term is traditionally understood. Typically, stained objects get darker by retaining more of the colorant. Wood stains intensify the visibility of the wood's grain. Biological stains selectively color certain substances for viewing in the microscope.

In one embodiment, the article of manufacture to be colored can include a textile article of manufacture. A textile is a flexible material consisting of a network of natural, artificial, or synthetic fibers often referred to as thread or yarn. Yarn is produced by spinning raw wool fibers, linen, cotton, or other material on a spinning wheel to produce long strands. Textiles are formed by, for example, weaving, knitting, crocheting, knotting, or pressing fibers together (felt). The words fabric and cloth are used in textile assembly trades (such as tailoring and dressmaking) as synonyms for textile. Textile refers to any material made of interlacing fibers. Fabric refers to any material made through weaving, knitting, crocheting, or bonding. Cloth refers to a finished piece of fabric. Examples of textiles that are non-limiting can include clothing, containers, bags, baskets, carpeting, upholstered furnishings, window shades, towels, coverings for tables, beds, and other flat surfaces, filters, flags, backpacks, tents, nets, coloring devices, handkerchiefs, rags, balloons, kites, sails, parachutes, rope, floor mats, doormats, brushes, mattresses, floor tiles, and sacking, or others. Textile materials can include animal hairs, wool, silk, grass, rush, hemp, sisal, coconut fiber, straw, bamboo, cotton, flax, jute, hemp, modal and even bamboo fiber, polyester, aramid fibers, acrylic fibers, nylon fibers, spandex, olefin fibers, lurex, or others.

In one embodiment, the article of manufacture can be made of a metal or metal alloy. Industrial parts or machinery can be colored with the supercritical noble gas coloring compositions and processes described herein. Any type of metal or alloy is suitable, such as without limitation, steel, stainless steel, nitinol, aluminum, or others. Metals can be colored with various pigments and dyes. Also, the metal may need additional manufacturing or processing to better adhere the colorant to the metal.

In one embodiment, the article of manufacture can be made of a ceramic. Dishes, pottery, bricks, pipes, floor, roof tiles, porcelain, china or others can be articles of manufacture prepared from a ceramic. Examples of ceramic materials that are non-limiting can include alumina oxide, zirconia oxide, carbides, borides, nitrides, silicides, or others. Porous ceramics may be easily colored with the supercritical colorant composition. Also, the ceramic may need additional manufacturing or processing to better adhere the colorant to the ceramic.

In one embodiment, the article can be glass.

In one embodiment, the article of manufacture can be a polymer or plastic article. The polymer or plastic can be resistant to the conditions of the coloring process, such as temperature and pressure, so as to be stable and not significantly degrade during the coloring. Polyurethanes, polycarbonates, polyacrylamides, polystyrene, polyester, or others are non-limiting examples.

Supercritical noble gas can be combined with one or more hydrocarbons for use in the coloring purposes. Mixtures of supercritical noble gases with hydrocarbons can be useful in coloring semiconductors. Also, the supercritical noble gases greatly reduce the amount of hydrocarbon solvents typically used during coloring processes. For example, argon can be combined with butane and formed into a supercritical mixture of about 1:2 to about 1:3 argon/butane. However, the ratio could range from about 10:1 to about 1:1, about 8:1 to about 1:1, or about 5:1 to about 1:1, or vice versa. The mixture can be converted to a supercritical fluid by obtaining a pressure of about 34 MPa (335 atmospheres) and temperature of about 20° C. The argon/butane can be used to carry a colorant to color the article in a coloring process for a duration recited herein or less. Other hydrocarbons that can be combined with a supercritical noble gas can include without limitation methane, ethane, propane, butane, ethylene, propylene, or any C1-C20 hydrocarbon that is substituted or unsubstituted with functional groups, or branched or unbranched, or cyclic or acyclic, or aromatic or aliphatic. In one aspect, an embodiment of the coloring composition specifically excludes the use of a hydrocarbon, or one or more specific hydrocarbons, in the noble gas supercritical fluid coloring composition that is environmentally friendly.

The supercritical noble gas can also be combined with one or more additional gases in order to prepare the supercritical coloring composition. The additional gases can be used to modulate the van der walls forces, which can change from noble gas to noble gas. As such, induced dipole is larger as the noble gas becomes heavier, and the additional gases can counteract or amplify these changes. Also, the noble gas can become softer in character (hard/soft theory) as the gas becomes heavier, and the additional gases can counteract or amplify these changes. The additional gases can be used to counteract or amplify these properties to change the solubility parameters of the supercritical noble gas fluids and thereby allow for improved ability to suspend colorant and impart the colorant to the article. Non-limiting examples of gases that can be used include a different noble gas, carbon dioxide, air, oxygen, nitrogen, or others. It can be beneficial for the additional gas to be non-reactive or have a minimal reactive profile in the conditions suitable for contacting a particular article with the supercritical coloring composition. The ratio of noble gas to additional gas can range from about 10:1 to about 1:1, about 8:1 to about 1:1, or about 5:1 to about 1:1, or vice versa. The duration of coloring can be similar to the length of time described herein or even shorter. In one aspect, an embodiment of the coloring composition specifically excludes the use of an additional gas in the noble gas supercritical fluid coloring composition.

The supercritical noble gas can also be combined with water to form a coloring composition. Water is commonly used in many coloring applications. However, water cannot be mixed with carbon dioxide because water reacts with carbon dioxide to form carbonic acid and carbonates. Now water can be combined with the supercritical noble gases so that the coloring benefits of water can be used in a supercritical fluid. Mixing water with noble gases can produce supercritical fluids that dissolve highly ionic colorants while still reducing water waste since it does not take much water to give the desired effect. While the use of supercritical noble gases can replace the use of water and reduce the environmental impact of coloring process, use of some water in supercritical coloring compositions can provide an appreciable benefit of water. The ratio of noble gas to water can range from about 10:1 to about 1:1, about 8:1 to about 1:1, or about 5:1 to about 1:1, or vice versa. The duration of coloring can be similar to the length of time described herein or even shorter. In one aspect, an embodiment of the coloring composition specifically excludes the use of water in the noble gas supercritical fluid coloring composition for an environmentally friendly coloring composition.

The supercritical noble gas can also be combined with one or more alcohols to prepare a coloring composition. However, alcohols cannot be mixed with carbon dioxide because the alcohols react with carbon dioxide to form organo-carbonates. Now alcohols can be combined with the supercritical noble gases so that the ability of alcohols to dissolve a colorant can be used in a supercritical fluid. Non-limiting examples of suitable alcohols include methanol, ethanol, propanol, n-propanol, isopropanol, or others. The ratio of noble gas to alcohol can range from about 10:1 to about 1:1, about 8:1 to about 1:1, or about 5:1 to about 1:1, or vice versa. The duration of coloring can be similar to the length of time described herein or even shorter due to the solvent characteristics of alcohols. In one aspect, an embodiment of the coloring composition specifically excludes the use of an alcohol in the noble gas supercritical fluid coloring composition for an environmentally friendly coloring composition.

The supercritical noble gas can also be combined with an organic solvent to form a coloring composition where the organic solvent can facilitate uptake of the colorant. Initially, the colorant can be soluble or absorbable into an organic solvent so that the colorant can more easily partition into the supercritical fluid upon exposure thereto, which can increase the ability to color an article of manufacture. Examples of organic solvents can include but are not limited to acetone, toluene, turpentine, methyl acetate, etheyl acetate, hexane, petrol ether, citrus terpenes, n-pentate, ethylene dichloride, dioxane, dimethyl sulfoxide, acetonitrile, pyridine, acetic acid, THF, methyl isobutyl ketone, methylene chloride, isooctane, cyclohexane, cyclopentane, carbon disulfide, carbon tetrachloride, o-xylene, benzene, dietheylether, chloroform, or others. The ratio of noble gas to solvent can range from about 10:1 to about 1:1, about 8:1 to about 1:1, or about 5:1 to about 1:1, or vice versa. The duration of coloring can be similar to the length of time described herein or even shorter due to the solvating ability of the solvent with regard to the colorant. In one aspect, an embodiment of the coloring composition specifically excludes the use of a solvent in the noble gas supercritical fluid coloring composition to be more environmentally friendly.

The supercritical noble gas can also be combined with one or more aroma compounds (e.g., fragrances) that can beneficially provide a nice smell to the article being colored, which can be advantageous especially for textiles. For example without limitation the aroma compound can be fragrances, essential oils, perfumes, methyl formate, methyl acetate, methyl butyrate, methyl butanoate, ethyl acetate, ethyl butyrate, ethyl butanoate, isoamyl acetate, pentyl butyrate, pentyl butanoate, pentyl pentanoate, octyl acetate, myrcene, geraniol, nerol, citral, lemonal, citronellal, citronellol, linalool, neriolidol, limonene, camphor, terpineol, alpha-ionone, thujone, benzaldehyde, eugenol, cinnamaldehyde, ethyl maltol, vanillin, anisole, anethole, estragole, thymol, or others. However, in some instances it may be desired to provide a noxious odor to the article being colored, such as when marking an item for an undesirable scent to keep animals or people away from the article. Non-limiting examples of aroma compounds that are noxious odorants can include trimethylamine, putrescine, diaminobutane, cadaverine, pyridine, indole, skatole, or others. The ratio of noble gas to aroma compound can range from about 10:1 to about 1:1, about 8:1 to about 1:1, or about 5:1 to about 1:1, or vice versa. The duration of coloring can be similar to the length of time described herein or even shorter. In one aspect, an embodiment of the coloring composition specifically excludes the use of an aroma compound in the noble gas supercritical fluid coloring composition to provide a substantially scentless composition.

The supercritical noble gas can also be combined with pH adjusters, such as but not limited to various buffer agents to prepare a coloring composition with a colorant. Non-limiting examples of pH adjusters include weak acids, weak bases, bicarbonates, ammonias, phosphates, monosodium phosphate, disodium phosphate, hydrochloric acid, sodium citrate, citric acid, acetic acid, sodium acetate, borax, sodium hydroxide, 3-{[tris(hydroxymethyl)methyl]amino}propanesulfonic acid, N,N-bis(2-hydroxyethyl)glycine, tris(hydroxymethyl)methylamine, N-tris(hydroxymethyl)methylglycine, 4-2-hydroxyethyl-1-piperazineethanesulfonic acid, or others. The ratio of noble gas to pH adjuster can range from about 10:1 to about 1:1, about 8:1 to about 1:1, or about 5:1 to about 1:1, or vice versa. The duration of colorant can be similar to the length of time described herein or even shorter. In one aspect, an embodiment of the coloring composition specifically excludes the use of a pH adjuster in the noble gas supercritical fluid coloring composition when pH adjustment is not needed or desired. These pH adjusters can be favorably used because they do not react with the supercritical noble gases, where the pH adjusters may be avoided in carbon dioxide systems due to the reactivity with carbon dioxide.

In one embodiment, the additional substance combined with the supercritical noble gas can be capable of either being in a supercritical fluid state when the noble gas is in a supercritical fluid state or the substance is absorbable into the noble gas in the supercritical state. In some instances, the additional substance can have a supercritical point that allows the substance to be in a supercritical fluid state along with the noble gas. In other instances, the combination of the noble gas and additional substance(s) can have a supercritical point where the combination is a supercritical fluid above the supercritical point (e.g., above the supercritical temperature and supercritical pressure for the composition). In other instances, the additional substance can be dissolved or solvated by or into the supercritical noble gas. Also, the additional substance can be absorbed or suspended in the supercritical noble gas. For example, a pigment colorant can be suspended in the supercritical noble gas. In any event, the supercritical noble gas can form a composition with the additional substance(s) located therein such that the combination of the supercritical noble gas and additional substance can function in a coloring process to color an article of manufacture. These additional ingredients allow the coloring composition to be tailored for a particular coloring purpose.

In one embodiment, the additional substance can have a supercritical pressure that is lower than the supercritical pressure of the noble gas, and/or the additional substance can have a supercritical temperature that is lower than the supercritical temperature of the noble gas. Also, the additional substance can have a supercritical pressure that is higher than the supercritical pressure of the noble gas, and/or the additional substance can have a supercritical temperature that is higher than the supercritical temperature of the noble gas. In another example, the supercritical noble gas and additional substance can be prepared as a supercritical fluid at a temperature range from about −50° C. to about 50° C., or from about −150° C. to about 150° C., or from about −273° C. to about 500° C. and/or at a pressure range from about 50 atm to about 400 atm, or from about 300 atm to about 600 atm, or from about 1 atm to about 2000 atm. Also, the supercritical point of a composition of noble gas and an additional substance can be obtained through routine experimentation, and the supercritical point can depend on the nature of the additional substance. Accordingly, the supercritical noble gas and additional substance can be at a temperature and pressure above the supercritical pressure and/or supercritical temperature of the mixture.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In one embodiment, a coloring system can include a noble gas composition that can be converted to a supercritical fluid. Also, the coloring system can include a colorant, such as any colorant described herein or others in the art. A "colorant" can be any type of chemical or substance that can impart "color" to an article when applied thereto. Common examples of colorants are dyes, pigments, and stains. A coloring system, as shown in FIGS. 2A-4 can also include one or more vessels that are configured to convert the noble gas into a supercritical fluid and/or receive and color an article of manufacture with a colorant, dissolved, suspended, or absorbed into the noble gas in the supercritical fluid state.

Figure 2A:
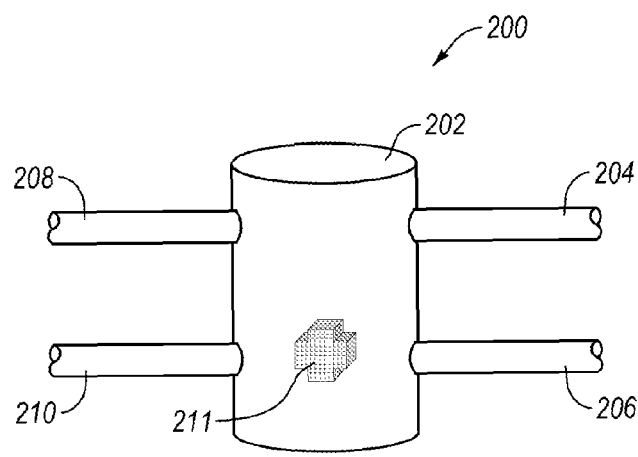
FIGS. 2A-2C are schematic diagrams of illustrative embodiments of coloring vessels.
Figure 2B:
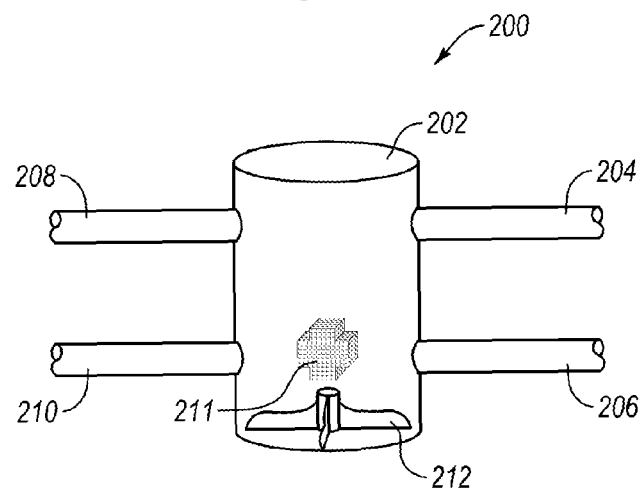
Figure 2C:
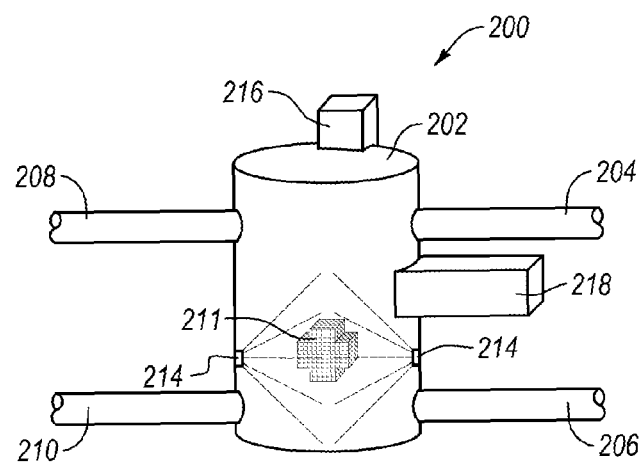

FIGS. 2A-2C shows illustrative embodiments of coloring vessels 202 that can be configured to color an article (not shown). In FIGS. 2A-2C, features are shown as schematic representations in order to identify the presence of a feature, while the shape, size, or operational configuration of the feature may differ from that which is actually shown. One of skill in the art will recognize that the schematic representations illustrate that a feature may be present, but that the feature may different in appearance from the example shown in the figures. The coloring vessel 202 can be configured as any chemical reaction vessel that is capable of operating at the high temperatures and pressures and having means (e.g., ports, doors, inlets or the like) for receiving/removing the article of manufacture as well as the supercritical fluids. The coloring vessel can include any type of shape of standard chemical reactors, such as spherical, cylindrical, cubic, or other. The coloring vessel 202 can be made of inert metals such as stainless steel and titanium, as well as others.

The coloring vessel 202 may also include a computing system and/or controller (not shown) that can receive instructions and operate the coloring vessel 202 as well as the doors or valves associated therewith. The computing system and/or controller can be configured as is well known in chemical processing systems and can communicate with other computing systems and/or controllers of other components in the coloring system. As such, the computing system and/or controller can be communicatively coupled with a communication network.

The coloring vessel 202 can include features found on common reaction vessels that are found in laboratory and/or industrial settings. As such, the coloring vessel 202 can include one or more inlets with doors or valves that can selectively open or close the inlet to allow an article or supercritical gas to enter into the coloring vessel 202 or close and stop any additional material from entering into the coloring vessel 202. For example, a door inlet can be useful for moving an article into or out from the coloring vessel 202 while a valve inlet can be useful for receiving the supercritical fluid or removing the contaminated supercritical fluid from the coloring vessel 202.

The coloring vessel 202 is associated with a noble gas source 204 configured to provide the noble gas to the coloring vessel 202 in a liquid, gas, or supercritical state, as well as in a coloring composition that optionally includes one or more additional substances combined with the noble gas. The noble gas source 204 is a schematic representation of an inlet, port, or the like that can supply the noble gas into the coloring vessel 202. The noble gas source 204 is shown as a tube that can supply the noble gas to the coloring vessel 202, and it may include valves, controllers, or other features for supplying the noble gas into the coloring vessel. The noble gas source 204 is shown substantially as a tube that can be connected to a processing component, such as a supercritical vessel that converts the noble gas into a supercritical fluid, that provides the noble gas to the coloring vessel 202. Since the noble gas is provided into the coloring vessel 202 as a fluid, the noble gas source 204 can have any suitable configuration for supplying such a fluid.

The coloring vessel 202 is also associated with an article source 206 configured for providing the article to be colored into the coloring vessel 202. The article source 206 is a schematic representation of an inlet, port, door, or the like that can supply the article (e.g., one or more objects) into the coloring vessel 202. The article source 206 is shown as a tube that can supply the article to the coloring vessel 202, and it may include valves, controllers, or other features for supplying the article into the coloring vessel. The article source 206 is shown substantially as a tube that can be connected to a supply of the article; however, the actual appearance of the article source 206 may be different from the illustration. The article source 206 can include conveyers to carry the article, augers for moving the article when in a particulate form (e.g., plastic pellets), or mechanical components for obtaining the article and supplying the article into the coloring vessel 202.

The coloring vessel 202 can also be associated with a noble gas outlet 208 configured to allow the noble gas and coloring byproducts to be removed from the coloring vessel 202 and separated from the colored article. The coloring byproducts can be dissolved, suspended, or otherwise absorbed into the supercritical fluid so that they can be removed from the coloring vessel 202 in any manner sufficient for fluid removal. The noble gas outlet 208 may be configured similarly as the noble gas inlet 204; however, the direction of flow is out from the coloring vessel 202. Accordingly, the noble gas outlet 208 is a schematic representation of an outlet, port, or the like that can remove the noble gas and byproducts from the coloring vessel 202. The noble gas outlet 208 is shown as a tube that can remove the noble gas and byproducts from the coloring vessel 202, and may include valves, controllers, or other features for removing the noble gas and byproducts from the coloring vessel 202. The noble gas outlet 208 is shown substantially as a tube that can be connected to a later processing component, such as a vessel that converts the noble gas from being supercritical into being a gas state. Since the noble gas is removed from the coloring vessel 202 as a fluid, the noble gas outlet 208 can have any suitable configuration for supplying such a fluid.

Additionally, the coloring vessel 202 can be associated with an article outlet 210 configured to allow the removal of the article from the coloring vessel 202, and which can be configured similarly to the article source 206. The article outlet 210 can be configured similarly as the article source 206. The article outlet 210 is a schematic representation of an inlet, port, door, or the like that can be used to remove the article (e.g., one or more objects) from the coloring vessel 202. The article outlet 210 is shown as a tube that can move the article from the coloring vessel 202 and supply the article to storage or for further processing, and it may include valves, controllers, or other features for removing the article from the coloring vessel. The article outlet 210 is shown substantially as a tube; however, the actual appearance of the article outlet 210 may be different from the illustration. The article outlet 210 can include conveyers to carry the article, augers for moving the article when in a particulate form (e.g., plastic pellets), or mechanical components that can physically move the article.

Optionally, the article source 206 and article outlet 210 can be the same component. 25 Also, the noble gas source 204 can be the same component as the noble gas outlet 208.

The coloring vessel in 202 is shown to be devoid of any mechanical agitating components and the coloring can be performed by the supercritical noble gas providing the colorant that can color the article by being passed over, around, through, or in contact with the article. The status of the noble gas as a supercritical fluid can absorb the colorant into the supercritical fluid so that the colorant is able to come into contact with the article. The noble gas source 204 and noble gas outlet 210 may be in continuous operation so that new noble gas is continually introduced into the coloring vessel 202 and contaminated noble gas with byproducts is continually removed from the coloring vessel 202, which can cause a supercritical fluid current or flow that moves through the coloring vessel 202 to provide the colorant to the article. Also, the coloring vessel 202 can be outfitted with nozzles (FIG. 2C), blowers (not shown), or other fluidic components that can induce the supercritical fluid to flow within the coloring vessel 202. Also, the supercritical fluid can have a circulatory environment within the coloring vessel 202, such as by convection, that circulates the colorant over, around, or through the article. Also, pressure cycling, which is described in more detail below, within the coloring vessel 202 can facilitate the coloring. For example, the pressure cycling can enhance the dissolving, suspending, or absorption of the colorant into the supercritical noble gas.

Additionally, the coloring system 200 can include one or more colorant holder 211 that is configured to hold the colorant and provide the colorant to the supercritical noble gas. The colorant holder 211 can be a permeable container that has at least one surface that is permeable to both the supercritical noble gas as well as the colorant particles. The colorant is optionally provided as a powder, pressed cube, or liquid within the colorant holder 211 such that the colorant can be dissolved, suspended, or absorbed into the supercritical noble gas.

FIGS. 2D-2H show representative examples of different colorant holders 211a, 211b, 211c, and 211d. The colorant holder 211a is configured as a filter disk with a pore size that is selected to allow colorant particles smaller than a predetermined size to be passed through the filter pores. The colorant holder 211a can include a filter that is configured similar to a mesh particle size separator. The colorant holder 211a can include pore sizes ranging from about 0.5 nm to about 500 microns, about 1 nm to about 250 microns, about 25 nm to about 100 microns, about 50 nm to about 50 microns, about 100 nm to about 1 micron, or about 250 to about 750 nm. The colorant holders 211b, 211c, and 211d, can be similarly configured, but can have: different shapes, different pore sizes, or other configurations.

Figure 2D:
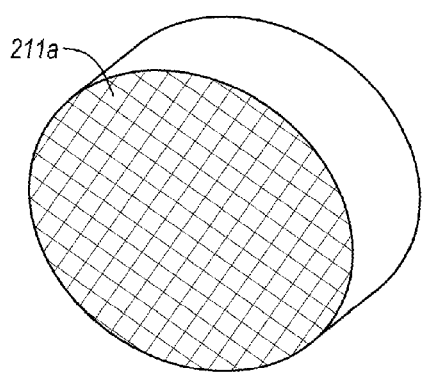
FIGS. 2D-2H are schematic diagrams of illustrative embodiments of colorant holders that can contain and release the colorant during a coloring process.

The holder 211a of FIG. 2D is shown as in a disk shape that has only one surface (cross-hatched) for releasing the colorant. As such, the size of the surface as well as the mesh size can be modulated for different types of colorants, different colorant release rates, or other release parameters.

Figure 2E:
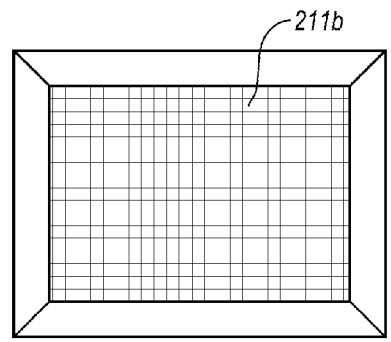

The holder 211b of FIG. 2E is shown to be rectangular with a beveled surface (cross-hatched) with a smaller cross-sectional area for releasing the colorant. This shows that the mesh surface can have a different size for controlling the release rate of the colorant.

Figure 2F:
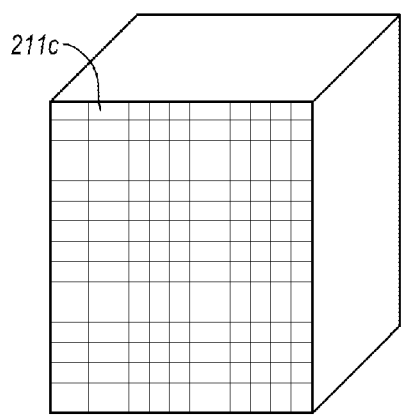

The holder 211c of FIG. 2F has a cubic shape showing one surface (cross-hatch) active in releasing the colorant. While not shown, the back surface opposite of the cross-hatch surface can also be mesh for releasing the colorant.

Figure 2G:
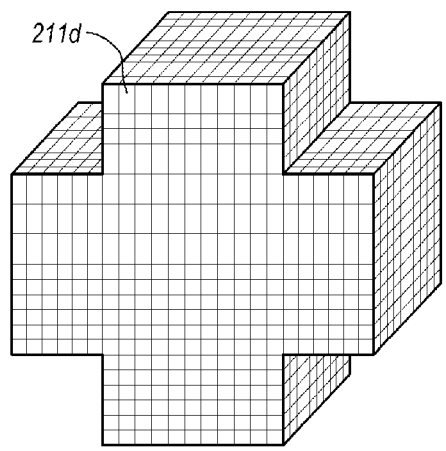

The holder 211d of FIG. 2G has a cross shape with the entirety of the external surface area being mesh (cross-hatch) so as to be capable of releasing the colorant from any surface. While not shown, each surface may be associated with a particular colorant so that the same holder 211d can retain and release multiple colorants, such as one colorant and colorant reservoir per surface or per arm of the cross.

Figure 2H:
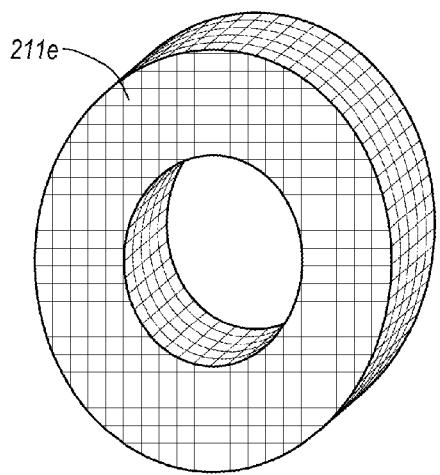

The holder 211e of FIG. 2H has a washer shape with an aperture. This configuration can allow for the supercritical fluid to pass through the aperture of the washer so that the colorant can be dispersed from the aperture as well as from the outer surfaces.

In one embodiment, the holder 211 can be associated with a controller and components that can selectively release the colorant as desired, programmed or controlled. As such, the holder 211 can include a mechanism that can be opened to release colorant or closed to stop colorant from being released. This can be beneficial with a colorimeter that measures the value of the color of the article so that more colorant is added when needed and stopped when the article is sufficiently colored.

In one embodiment, the holder 211 can be configured to retain more than one type of colorant so that the colorants can be released together or separately. As such, the holder having more than one color reservoir and being associated with a controller can be controlled to release the colorants together or separately.

FIG. 2B shows a coloring vessel 202 with a mechanical agitator 212; however, multiple agitators 212 can be used. Mechanical agitators 212 are well known components of chemical processing and can use any of a variety of agitating members to agitate the supercritical fluid as well as the article. The mechanical agitator 212 can be configured similarly as any stirring, mixing, or kneading device, which are well known. For example, the mechanical agitator 212 can be a magnetic stirrer. Also, the mechanical agitator 212 may be associated with a controller such that it is controllable or programmable, where the controller may be communicatively coupled with a central computing system or controller. The mechanical agitator 212 can agitate the colorant holder 211, or the colorant holder 211 can be attached to the interior or the coloring vessel 202 so that it is not impacted by the mechanical agitator.

FIG. 2C shows a coloring vessel 202 with two nozzles 214 configured to direct the supercritical noble gas over the article; however, one or multiple nozzles can be used. The nozzles can be used to increase the rate at which dye is absorbed by the article. The nozzles could be part of a loop where supercritical noble gas fluid is constantly flowed over the dye to increase the rate of uptake. Furthermore the increased flow rate allows high penetration of the article that dye is being applied to. The nozzles 214 can be located at any suitable position within the coloring vessel 202 so that the nozzles 214 blow the supercritical fluid over the holder 211 and/or the article. The nozzles 202 can be fluidly coupled with the noble gas source 204 so that fresh supercritical fluid is blown, or the nozzles can be coupled with a pump to recycle supercritical fluid with or without the colorant and blow the supercritical fluid with or without the colorant.

Additionally, FIG. 2C shows that the coloring vessel 202 can be outfitted with temperature controlling components 216 configured to allow the coloring vessel to modulate the temperature of the noble gas to above and/or below the supercritical temperature. The temperature controlling components 216 can include without limitation heaters, heat transfer components, heat exchangers, heating jackets, coolers, refrigeration components, cooling jackets, or other temperature controlling components 216. Also, FIG. 2C shows that the coloring vessel 202 can be outfitted with pressure controlling components 218 configured to modulate the pressure above and/or below the supercritical pressure. The pressure controlling components 218 can include without limitation pumps, pressurizers, bleed valves, compressors, or others. Temperature controlling components 216 and pressure controlling components 218 are well known in the art. Thus, the coloring vessel 202 can receive the supercritical noble gas and/or convert the noble gas to a supercritical fluid, and back again to a gas or liquid noble gas.

Additionally, the coloring vessel 202 of FIG. 2C can include nozzles 214 that are configured to direct flow of the supercritical noble gas onto or at the colorant holder 211. The nozzles 214 can blow fresh supercritical noble gas, or the coloring vessel 202 can include pumps or sprayers that can blow supercritical gas from within the coloring vessel out from the nozzles 214.

In one embodiment, the coloring vessel 202 of FIG. 2C can be configured as a pressure autoclave. Also, the temperature controlling components 216 can include an oil heater, heating oil, and an oil jacket that is in contact or around at least a portion of the coloring vessel 202.

Figure 3:
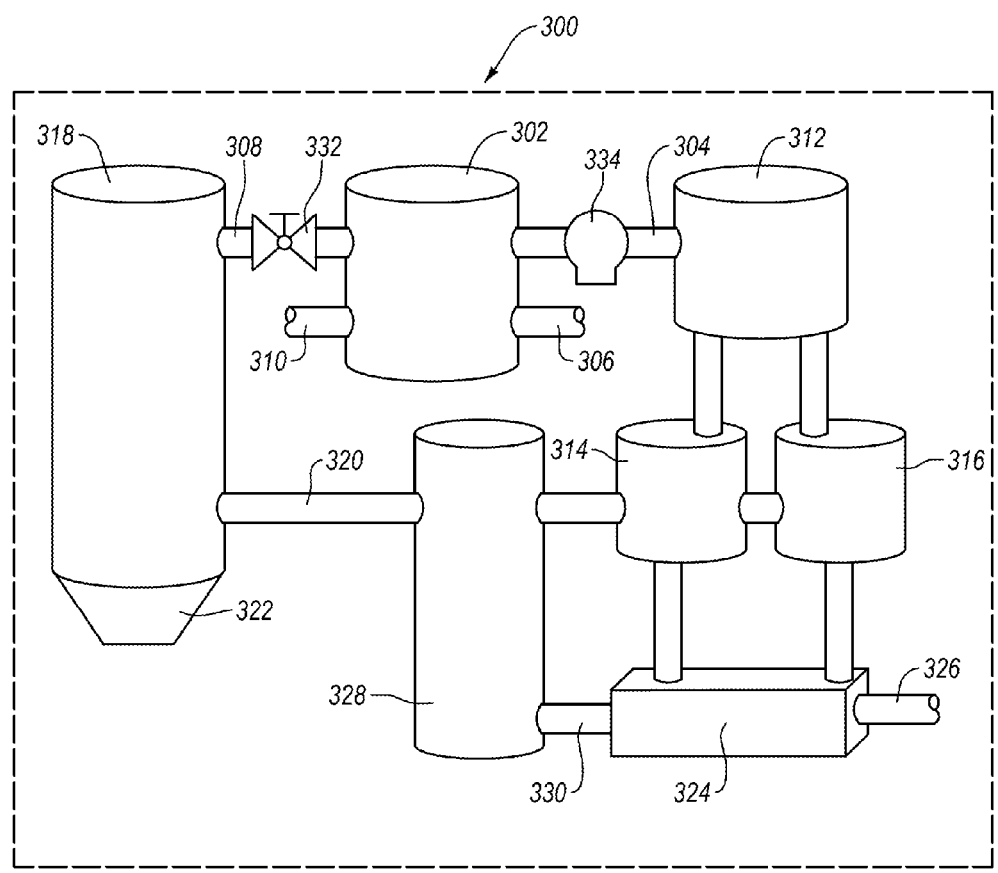
FIG. 3 is a schematic diagram of an illustrative embodiment of a coloring system.

FIG. 3 shows another example of a coloring system 300 for use with supercritical noble gases. Similar to FIG. 2A, the coloring system 300 can include a coloring vessel 302 associated with a noble gas inlet 304, an article inlet 306, a noble gas outlet 308, and an article outlet 310, where one or more of these components can be combined. The noble gas inlet 304 can receive the noble gas from a supercritical fluid vessel 312 configured to convert the noble gas to a supercritical fluid, such as by modulating the temperature and/or pressure.

In some instances, the functionality of the supercritical fluid vessel 312 can be accomplished with a pressure unit 314 and/or a temperature unit 316. As such, the pressure unit 314 and/or temperature unit 316 can be fluidly coupled with the noble gas inlet 304, and further can be fluidly coupled with each other so that both temperature and pressure can be modulated to convert the noble gas to a supercritical fluid. The pressure unit 314 can be configured to increase pressure of the noble gas to or past the supercritical pressure of the noble gas. The temperature unit 316 can include heating components and function as a heater to heat the noble gas above the supercritical temperature. Also, the temperature unit 316 can include cooling components in the instance that the supercritical noble gas should need to be cooled before coloring a particular article. The supercritical fluid vessel 312, pressure unit 314, and/or temperature unit 316 can provide the supercritical noble gas to the a coloring vessel 302, which is configured to receive the noble gas in a supercritical fluid state and to receive an article of manufacture to be colored.

FIG. 3 also shows that the coloring system 300 can be capable of recycling the noble gas for use in subsequent coloring processes. As shown, the coloring vessel 302 is coupled to a separation vessel 318 configured to receive the noble gas with one or more coloring byproducts from a coloring vessel 302 and to decompress the noble gas to a gaseous state so that the noble gas can be separated from the one or more coloring byproducts. Once the noble gas and coloring byproducts are separated, the noble gas can be recycled by being passed out of the separation vessel 318 through a recycling outlet 320. The coloring byproducts that are solid or liquid can be removed from the separation vessel through a colorant byproduct outlet 322 (e.g., waste outlet).

After being removed from the separation vessel 318, the recycled noble gas can be passed into a cooling unit 328 configured to receive the noble gas in a supercritical fluid state or gaseous state and to reduce the temperature of the noble gas to a liquid state. The cooling unit 328 can be outfitted with various cooling components such as refrigeration components and fluids that can cool the noble gas to a liquid.

In one option, the coloring system 300 can include a noble gas storage vessel 324 configured to store the noble gas in a supercritical fluid, gaseous, or liquid state.

The coloring system 300 can also include a fresh noble gas inlet 326 to receive fresh noble gas into the system. Also, the inlet 326 can receive other additional substances as described herein. Alternatively, any of the components of the system can include an inlet for receiving a noble gas or additional substance.

The coloring system 300 can include one or more fluid passageways 330 that connect the components of the coloring system 300 together so that the noble gas can flow between the different components while in the liquid, gas, or supercritical state. Also, the dashed box around the coloring system 300 is meant to illustrate that any of the components can be fluidly coupled together with a fluid passageway even if not explicitly shown. For example, the recycling outlet 320 can be directly fluidly coupled with the noble gas storage vessel 324, pressure unit 314, temperature unit 316, supercritical fluid vessel 312, coloring vessel 302, or others.

The coloring system 300 can also include one or more valves 332 located at various positions in the system 300 with respect to the different components and fluid passageways 330, such as component inlets and outlets. The valves 323 can regulate the entry or exit of the noble gas to and from the various components, and any component can be outfitted with one or more valves so that fluid flow can be regulated. The dashed box around the coloring system 300 is also meant to illustrate that any of the components can include one or more valves 332 to regulate fluid flow or even the removal of the colorant byproducts from the separation vessel 318. Additionally, the valves 323 can be associated with a controller that can control the valves 323 to be open or closed as well as what percentage open the valve is when variable. The controller can allow for the operation of the valves to be controlled or programmed as necessary or desired. Also, the dashed box can represent that the controllers of the valves 323 are in communication with a central computing system or controller, and may be operably coupled with a communication network.

The coloring system 300 can also include one or more pumps 334 located at various positions in the system 300 with respect to the different components and fluid passageways 330. The pumps 334 can pump the noble gas to and from the various components through the passageways 330. The dashed box around the coloring system 300 is also meant to illustrate that any of the components can include one or more pumps 334 to regulate fluid flow or even the removal of the colorant byproducts from the separation vessel 318.

In one embodiment, the coloring system 300 can exclude various components or the functionality of multiple components can be combined into a single component. In instances that the coloring system 300 includes a supercritical fluid vessel 312, the pressure unit 314 and/or temperature unit 316 can be omitted, or vice versa. Also, the storage vessel 324 and cooling unit 328 can be omitted.

In one embodiment, the coloring system 300 can be configured so that the noble gas having contaminant is obtained and removed from the system, and is not recycled in the system. As such, the separation vessel 318, cooling vessel 328, and storage vessel 324 may be omitted. Also, the various fluid passageways 330 may be omitted as the fluids can be transferred between the components manually or by using containers to move the noble gas around the system 300.

The one or more vessels of the coloring system 300 can be linked together so that the noble gas in the liquid, gas, or supercritical state can pass through fluid passageway between the different vessels. Also, the different vessels or components can be configured for a particular purpose.

A supercritical fluid vessel 312 can be configured to convert the noble gas to a supercritical fluid. As such, the supercritical fluid vessel 312 can be outfitted with compressors, pressurizers, coolers, and heaters that are able to increase the pressure and temperature to or past the supercritical point. The supercritical fluid vessel 312 can be controlled by a controller (not shown) so that the operation thereof can be controlled and/or monitored. Also, the supercritical fluid vessel 312 can be configured to receive the colorant, with or without a colorant holder, so that the preparation of the supercritical noble gas also entrains the colorant particles within the supercritical noble gas.

A pressure unit 314 can be configured to increase pressure of the noble gas to or past the supercritical pressure of the noble gas. The pressure unit 314 can be outfitted with compressors, plunger systems, or other pressurizing components that can increase the pressure of the noble gas to or past the supercritical pressure. The pressure unit 314 can be controlled by a controller (not shown) so that the operation thereof can be controlled and/or monitored.

A temperature unit 316 (e.g., heating unit) can be configured to increase temperature of the noble gas to or past the supercritical temperature of the noble gas. The temperature unit 316 can be outfitted with heating elements, heating fluids, fluid cycling components, heat exchangers, or other components that can be used to increase the temperature of the noble gas to or past the supercritical temperature. The temperature unit 316 can be controlled by a controller (not shown) so that the operation thereof can be controlled and/or monitored.

A coloring vessel 302 can be configured to receive the noble gas in a supercritical fluid state and to receive an article of manufacture to be colored. Alternatively, the coloring vessel 302 can include components similar to the supercritical unit 312, pressure unit 314, and temperature unit 316 so that the supercritical state can be achieved, maintain, or modulated in and out of the supercritical fluid state. The coloring vessel 302 can be configured similarly to any common supercritical chemical reactor or separator. An example of a coloring vessel can be a HPR-Series High Pressure Chemical Reactor from Supercritical Fluid Technologies. An example coloring vessel 302 can be characterized as follows: stirred reactor vessel from 50 ml to 800 liter capacity; operate up to 10,000 psi (689 Bar/68.9 MPa/680 atmospheres) and 350° C.; magnetic drive mixing; safety rupture disc assembly; integrated controller with color touch screen; data export via a flash drive communications port; and/or data export via wire, optical, or wireless communication with a data network. The coloring vessel 302 can be controlled by a controller (not shown) so that the operation thereof can be controlled and/or monitored.

A separation vessel 318 can be configured to receive the noble gas with one or more coloring byproducts from a coloring vessel 302. Optionally, the separation vessel 318 can decompress the noble gas to a gaseous state so that the noble gas can be separated from the solid and liquid coloring byproducts. Also, the separation vessel 318 can be operated similar to a distillation column or a chromatography column in the ability to separate the noble gas from the coloring byproducts. The separation vessel 318 can be controlled by a controller (not shown) so that the operation thereof can be controlled and/or monitored.

A noble gas storage vessel 324 can be configured to store the noble gas in a supercritical fluid, gaseous, or liquid state. Any type of storage vessel with adequate strength can be used depending on the state of the noble gas. Common chemical tanks may be appropriate.

A cooling unit 328 can be configured to receive the noble gas in a supercritical fluid state or gaseous state and to reduce the temperature of the noble gas to a liquid state. As such, the cooling unit 328 can be outfitted with cooling components, refrigeration components, refrigeration fluids, cryogenic components, or others. The cooling unit 328 can be controlled by a controller (not shown) so that the operation thereof can be controlled and/or monitored.

The valves 332, pumps 334, or any other components can be controlled by a controller (not shown) so that the operation thereof can be controlled and/or monitored.

In one embodiment, the coloring system 300 can include a master controller (not shown) that is configured to control and/or monitor the operating conditions and parameters of each of the coloring system components. The master controller can include a microcontroller to perform all computational, instructional, or data processing functions. The microcontroller and power control components can be located in any module which may reside in association of the coloring system 300. The master controller can communicate with any of the controllers associated with any of the coloring system 300 components. Also, the master controller can be configured similar to a standard computer and include graphical user interfaces (e.g., computer screen or printer), and input interfaces (e.g., keyboard, mouse, light pen, voice recognition, touch screens, pushbuttons, knobs, etc.). The master controller can implement: temperature control, agitator speed control, pressure control, over-temperature limit control, valve control, pump control, or other controlling or monitoring functions. The dashed line box around the coloring system 300 also illustrates that the master controller can communicate with any of the components.

Figure 4:
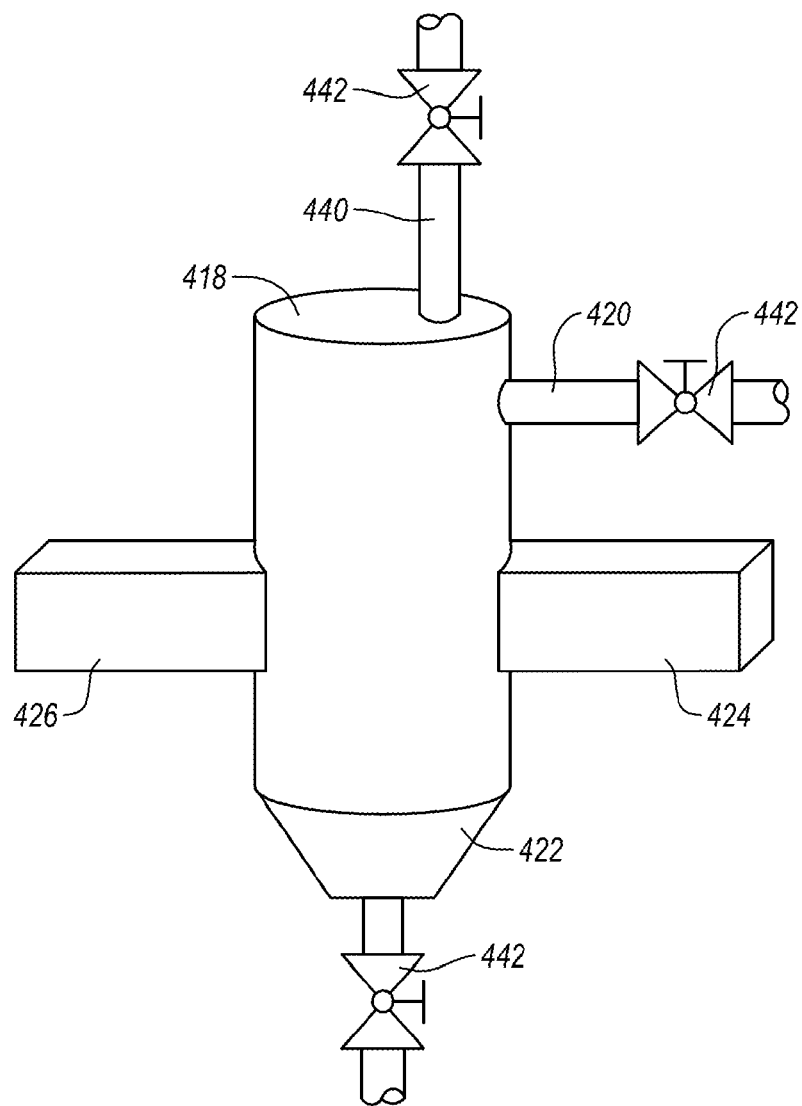
FIG. 4 is a schematic diagram of an illustrative embodiment of a separation vessel.

FIG. 4 shows an embodiment of a separation vessel 418. The separation vessel 418 can receive the noble gas and coloring byproducts from the coloring vessel 302 as shown in FIG. 3. Also, the separation vessel 418 can have an inlet 440 that is regulated with a valve 442. The separation vessel 418 can include the recycling outlet 420 that is associated with a valve 442 and coloring byproduct outlet 422. The valve 442 associated with the recycling outlet 420 can function as a decompressor so as to decompress the noble gas to a gaseous state. Also shown are a temperature modulating component 424 (e.g., heater or cooler) and pressure modulating component 426 that can operate to modulate the temperature and pressure in order to facilitate separation of the noble gas from the contaminates. The separation vessel 418 can also include a coloring byproduct outlet 422 that is associated with a valve 442 for removal of the byproducts from the separation vessel 418. The recycling outlet 420 can be configured as a gas outlet that can release the noble gas in the gaseous state from the separation vessel 418.

The coloring systems described herein of course can include the noble gas for use in'coloring, whether in the liquid, gas, or supercritical state. Also, the coloring system can include at least one additional substance to be combined with the noble gas in the supercritical fluid state for coloring. The additional substance may be, without limitation, a gas, an alcohol, a hydrocarbon, a halogenated hydrocarbon, a ketone, an aldehyde, an aromatic hydrocarbon, or a phenol, or a combination thereof. Non-limiting examples of gas can include a different noble gas, carbon dioxide, air, oxygen, nitrogen, water. Non-limiting examples of hydrocarbon may include methane, ethane, propane, butane, ethylene, and propylene. Non-limiting examples of alcohol may include methanol, ethanol, n-propyl alcohol, isopropyl alcohol, isobutyl alcohol, and cyclohexanol. Non-limiting examples of ketones may include acetone or cyclohexanone. Non-limiting examples of aldehyde may include formaldehyde or acetaldehyde. Non-limiting aromatic hydrocarbon may include benezene, toluene, or various isomers of xylenes. Non-limiting examples of xylenol may include phenol, or various isomers of xylenols. In one aspect, the additional substance is capable of either being in a supercritical fluid state when the noble gas is in a supercritical fluid state or the substance is absorbable into the noble gas in the supercritical state.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The coloring systems shown in FIGS. 2-4 can be used in a coloring process for coloring an article of manufacture with the supercritical fluid. The coloring process described herein can be performed similarly to coloring processes that have used carbon dioxide in its supercritical state. Improvements thereover can include the use of supercritical noble gases that are less reactive and have fewer propensities to damage the article being colored. Other advantages of using noble gases are described herein.

In one embodiment, a coloring process can include converting a noble gas into a supercritical fluid state, and coloring an article of manufacture with a colorant dissolved, suspended, or absorbed into the noble gas in the supercritical fluid state so as to color the article of manufacture. The coloring process can be conducted similar to supercritical carbon dioxide coloring processes. The noble gas can be a major or minor component in the coloring composition and can range by weight from at least about 10%, at least about 20%, at least about 30%, at least about 40%, at least about 50%, at least about 60%, at least about 70%, at least about 80%, at least about 90%, at least about 99%, or about 100% by weight. The noble gas can range from about 10% to about 99%, or from about 20% to about 80%, or from about 30% to about 70%, or from about 40% to about 60%, or about 50% by weight or by volume.

In one embodiment, the coloring process can include combining one or more additional substances with the noble gas in the supercritical fluid state before or during the coloring. The mixture can include the additional substances at various ratios with regard to the noble gas as recited herein in weight/weight ratios. Some non-limiting examples of the additional substance can include a different noble gas, carbon dioxide, air, oxygen, nitrogen, ammonia, water, alcohols, methane, ethane, propane, butane, ethylene, propylene, methanol, ethanol, acetone, or combinations thereof as well as others recited herein.

In one embodiment, the coloring process can include cycling the pressure of the noble gas in the supercritical fluid state during the coloring. Such pressure cycling can be done by compression and/or expansion of the coloring vessel volume, or modulating the pressure by releasing some noble gas in to or out of the separation vessel. The pressure cycling can reduce the pressure of the noble gas below the supercritical pressure and/or increase the pressure of the noble gas above the supercritical pressure. For example, the pressure cycling can change the state of the noble gas from a supercritical fluid to a state where at least a part of the noble gas is not in supercritical fluid state. Such pressure cycling can cause nucleation and generation of gas bubbles within the supercritical fluid, and some nucleation can occur by the colorant particles being nucleating agents. Also, the bubble generation can function similarly as boiling for removing the colorant particles from the colorant holder from the article. Thereby, the nucleation event can facilitate coloring the article of manufacture.

In one embodiment, the coloring process can include cycling the temperature of the noble gas in the supercritical fluid state during the coloring. The temperature cycling can reduce the temperature of the noble gas below the supercritical temperature and/or increases the temperature of the noble gas above the supercritical temperature. The temperature cycling can change the state of the noble gas from a supercritical fluid to a state where at least a part of the noble gas is not in supercritical fluid state. The temperature cycling can also facilitate bubble generation.

In one embodiment, the coloring process can include generating bubbles in the presence of the article of manufacture while being colored or introducing bubbles into the coloring vessel.

In one embodiment, the coloring process can include agitating the article of manufacture in a manner that is similar to various coloring methods that agitate an article to be colored in the presence of a coloring composition. The agitating can be from mechanical agitation with a stirring mechanism, spinning mechanism, or other agitation mechanism. Also, the agitating can be obtained by bubble generation.

The coloring process can also include removing the noble gas and one or more byproducts from the article of manufacture. The noble gas and coloring process byproducts can be removed in a continual basis where a feed of noble gas containing the byproducts is siphoned from the coloring vessel during the coloring process, and whereby noble gas is optionally introduced into the coloring vessel to maintain the supercritical fluid. For example, the siphoning of the noble gas can facilitate the pressure cycling. Alternatively, the coloring process can operate on a batch basis where the supercritical noble gas and byproducts are removed after coloring. In another alternative, the same article can undergo multiple cycles of coloring with fresh noble gas and colorant, which is removed, and then replaced during each cycle.

In one embodiment, the coloring process can include separating the noble gas from one or more byproducts after being removed from the coloring vessel. For example, the separation can be performed in the separation vessel. The separation can include converting the noble gas to a gaseous state to facilitate separating the noble gas from the one or more byproducts, which one or more contaminants are in a solid or liquid state.

In one embodiment, the coloring process can include recycling the noble gas for additional coloring cycles of the same or different articles. The recycling process can include cooling the noble gas from a gaseous state to a liquid state after being separated from the one or more byproducts. The liquid noble gas can then be stored in a storage vessel before being used again or converted to a supercritical fluid.

In one embodiment, the coloring process can include converting the noble gas to a supercritical fluid after being separated from the one or more byproducts. As such, the recycling process can include converting the noble gas to a supercritical fluid before being used again in another coloring process.

In one embodiment, the recycling process can include separating the noble gas from the additional substance after the coloring. Such a separation can be performed in the separation vessel described herein, or a dedicated separation vessel can be provided in the coloring system for separating the noble gas from the additional substances used for coloring. The separation can be similar to the process for generating noble gases from the environment.

In one embodiment, the coloring process can include introducing the noble gas in the supercritical fluid state into a coloring vessel; introducing the article of manufacture into the coloring vessel; introducing a colorant into the coloring vessel; and coloring the article of manufacture with the colorant entrained in noble gas in the supercritical fluid state within the coloring vessel. Accordingly, the noble gas can be converted into a supercritical fluid before being introduced into the coloring vessel, with or without the colorant. Alternatively, the noble gas can be converted to a supercritical fluid within the coloring vessel where the colorant is within the coloring vessel for entrainment within the supercritical noble gas. The article usually will be introduced into the coloring vessel along with the colorant, with or without a colorant holder, before the noble gas.

In one embodiment, the coloring process can include increasing the pressure of the noble gas to or past the supercritical pressure of the noble gas before being introduced into the coloring vessel. Also, the coloring process can include increasing temperature of the noble gas to or past the supercritical temperature of the noble gas before being introduced into the coloring vessel.

In one embodiment, the coloring process can include storing the noble gas in a supercritical fluid, gaseous, or liquid state before or after the coloring.

The process of coloring with the noble gases can begin with introduction of a noble gas such as argon. The argon can be compressed at roughly 500 atmospheres to its supercritical form. Compression raises the temperature; possibly to a temperature that is too high for the application and as such the argon may be cooled as necessary. Furthermore, the cooling can allow the argon to be stored for future colorings if not immediately needed. The fluid argon can be pumped through a controlled temperature element that warms or cools the liquid noble gas to the temperature at which the coloring is performed.

Coloring is accomplished in a vessel where the articles to be colored and the colorant are introduced. The waste stream from the colored articles can be returned to the separation vessel. In an illustrative example, the supercritical argon containing dissolved colorant process byproducts is bled off in the separator vessel, where the supercritical argon is decompressed to return it to the gaseous state. The byproducts remain in liquid or solid form and are removed from the separator, while the argon gas is sent through a refrigeration or compression unit to return it to a liquid form for storage to be reused again. Recycling of argon in this closed loop system means only a small portion of the coloring solution has to be 20 replaced over time due to system leakage. The now colored article of manufacture (e.g., parts or clothes) can be removed from the chamber and are immediately ready for the next step in the manufacturing process or to be worn, since no drying or rinsing is required to remove residual coloring solution.

Figure 5:
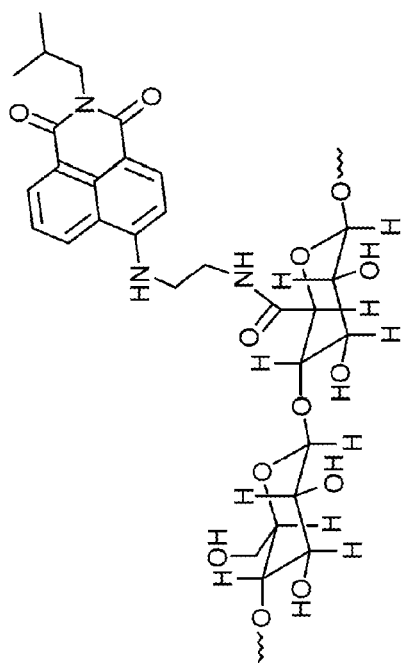
FIG. 5 is a schematic of an illustrative embodiment of a chemical reaction between a natural fiber and an isoquinoline derived dye.
Figure 5:
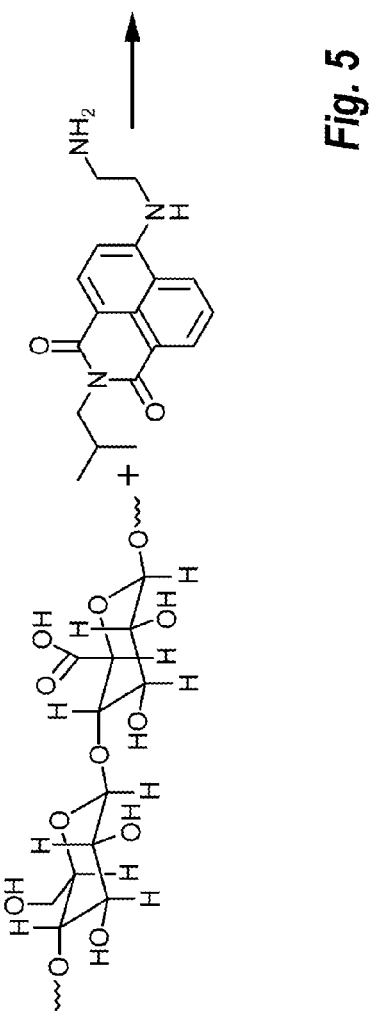

FIG. 5 illustrates a representative chemical reaction between a natural fiber and an isoquinoline derived dye. Similar chemical reaction between dyes and articles of manufacture can produce articles that are color fast and resistant to color degradation or lightening.

The carbon atom in carbon dioxide molecule carries a strong positive charge even though the symmetric linear structure of carbon dioxide creates a non-polar molecule. The positive charge on the carbon renders carbon dioxide susceptible to nucleophilic attack. For example, carbon dioxide readily reacts with amines to form carbamic acid and carbamides. The chemical reactivity of carbon dioxide imposes limitation as to what fibers and dyes are compatible with carbon dioxide based dyeing process.

Figure 6:
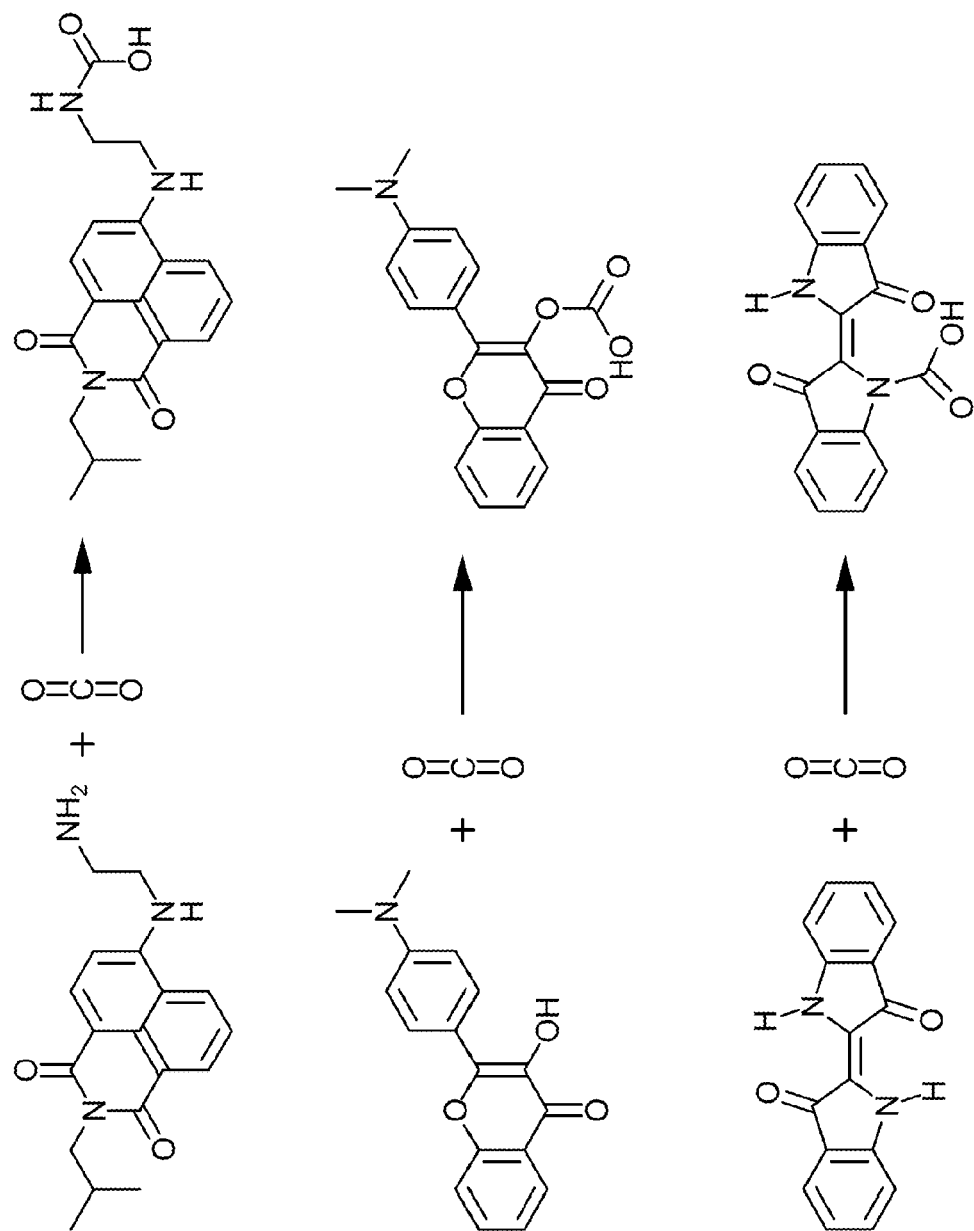
FIG. 6 is a schematic of illustrative embodiments of chemical reactions between carbon dioxide and various dyes.

FIG. 6 illustrates representative chemical reactions between carbon dioxide and several example dyes. These reactions show that supercritical carbon dioxide may be unfavorable for these coloring applications because carbon dioxide may derivatize the dyes into dye derivatives, which may be unable to react with and therefore dye the article of manufacture. In addition, carbon dioxide is known to react with polymers such as triacetate and natural fibers such as cellulose, which makes it unsuitable for many coloring applications. The noble gases are chemically inert and would be a passive solvent for the reactions to take place between textile and dye. Therefore, the limitations with carbon dioxide may not be applicable to the noble gases.

An example of a coloring process as described herein is provided as follows. A 4-L stainless steel autoclave can be used as the coloring vessel, which is essentially a pressure autoclave. The temperature of the dyeing process is accomplished by setting the temperature of an oil heater. The jacket of the coloring vessel is preheated prior to each coloring process. After the preheating step, dye powder (0.2±0.01 g) is placed at the bottom of the vessel, between two stainless steel filter plates with a pore size of 10 μm (e.g., colorant holder) to prevent entrainment of un-dissolved dye particles. A piece of cotton (20±0.2 g) is folded around small pieces of polyester, nylon, silk and wool (each 0.2±0.02 g). The textile is placed in the dyeing vessel in such a way that supercritical argon is forced to flow through the stainless steel filter plates and through the layers of textile. The system is then pressurized with an air-driven plunger pump, from Williams Instrument Company. The argon is pumped at a flow rate of 0.10±0.02 $m^3$/h, with a centrifugal pump with magnetic coupling from Autoclave Engineers. The flow direction of supercritical argon through the vessel is such to prevent un-dissolved dye being exposed to the textile; first, argon flows through the dye to dissolve it, through the filter, and then through the textiles. Temperature and pressure are increased slowly in the first period of time (10 minutes to an hour) but are constant afterwards (±1° C. and ±2 bar). The coloring process is run until the dye is consumed and is on the fabric. Reaction conditions vary for dye and textile combinations; however, a process with a vinyl sulfone dye as shown in FIG. 4 would typically be run at 113° C. and roughly 450 atmospheres.

In one embodiment, the coloring process can include preparing a noble gas composition. Noble gases can be separated from the atmosphere and processed into pure or substantially pure noble gases. For example, the noble gas can be prepared by liquefaction of the atmosphere, followed by distillation, and isolation of the noble gases from other components of the atmosphere. The noble gas argon constitutes nearly 1% of the earth's atmosphere, and is plentiful and inexpensive. The other noble gases and mixtures of the noble gases such as krypton and xenon are also useful in the coloring process.

In one embodiment, the coloring process can include preparing a coloring composition that includes a noble gas, a colorant, and an additional substance. For example, noble gases can be mixed with the colorant and with one or more additional substances, such as other gases, such as carbon dioxide or nitrogen, or solvents such as water, or alcohols, as well as any additional substances described herein. The compositions are then compressed to their supercritical points where they are useful for entraining coloring agents therein (see FIG. 1). Supercritical fluids are by definition at a temperature and pressure greater than or equal to the supercritical temperature and pressure of the fluid.

In one embodiment, mixed component supercritical systems containing the noble gases can be prepared. For example, a mixture can include argon, carbon dioxide, and isopropanol. By using mixed supercritical fluids, the coloring solutions can be tailored for the specific substrates being colored and the specific colorants being used for coloring. Furthermore, the use of mixed systems allows for the tailoring of the pressures and temperatures required to achieve supercritical fluids. Supercritical fluids can be made with carbon dioxide and argon, argon and water, argon-acetone, or others. Table 1 shows the supercritical points of various substances that can be combined with the noble gases.

TABLE 1

Supercritical properties of various solvents

| Solvent | Molecular weight g/mol | Supercritical temperature K | Supercritical pressure MPa (atm) | Supercritical density g/cm$^3$ |
|---|---|---|---|---|
| Carbon dioxide ($CO_2$) | 44.01 | 304.1 | 7.38 (72.8) | 0.469 |
| Water ($H_2O$) | 18.015 | 647.096 | 22.064 (217.755) | 0.322 |
| Methane ($CH_4$) | 16.04 | 190.4 | 4.60 (45.4) | 0.162 |
| Ethane ($C_2H_6$) | 30.07 | 305.3 | 4.87 (48.1) | 0.203 |
| Propane ($C_3H_8$) | 44.09 | 369.8 | 4.25 (41.9) | 0.217 |
| Ethylene ($C_2H_4$) | 28.05 | 282.4 | 5.04 (49.7) | 0.215 |
| Propylene ($C_3H_6$) | 42.08 | 364.9 | 4.60 (45.4) | 0.232 |
| Methanol ($CH_3OH$) | 32.04 | 512.6 | 8.09 (79.8) | 0.272 |
| Ethanol ($C_2H_5OH$) | 46.07 | 513.9 | 6.14 (60.6) | 0.276 |
| Acetone ($C_3H_6O$) | 58.08 | 508.1 | 4.70 (46.4) | 0.278 |

In one embodiment, the coloring composition is free of volatile organic compounds so as to be zero-VOC.

There are many advantages to the use of supercritical noble gases, such as, for example: being non toxic, non-carcinogenic, non-mutagenic, non-reactive, and non-combustive; do not harm the ozone layer; do not act as green house gases; being equal to or better than supercritical carbon dioxide in coloring ability; compression technology easily reaches the supercritical points of argon, krypton, and xenon; and waste removed from the articles being colored is easily separated from the noble gases. Also, the coloring process can be done without water so that environmental water is not polluted by the coloring process.

In an illustrative embodiment, any of the systems, operations, processes, etc. described herein can be implemented as computer-readable instructions stored on a computer-readable medium. For example, a computer-readable medium can include computer-executable instructions for performing the coloring process, operating any of the coloring system components, obtaining data from any of the coloring system components, or communicating data to a remote location via a network. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented 25 via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs 30 running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and nonvolatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a' group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All embodiments of the coloring system, coloring compositions, or coloring processes can be used in an interchangeable manner and all embodiments can be used together, as allowable.

What is claimed is:

1. A composition for coloring an article, comprising:
   a supercritical fluid comprising a noble gas in a supercritical state; and
   a colorant within the supercritical fluid.

2. The composition of claim 1, wherein the noble gas comprises at least one of helium, argon, krypton, neon, xenon, and radon.

3. The composition of claim 1, wherein the colorant comprises at least one of a dye, an organic dye, an inorganic dye, a pigment, and a stain.

4. The composition of claim 1, wherein the colorant comprises a hydrocarbon.

5. The composition of claim 4, wherein the supercritical fluid comprises argon and is mixed with the hydrocarbon in the supercritical state.

6. The composition of claim 1, further comprising at least one of carbon dioxide, oxygen, nitrogen, water, an alcohol, an aldehyde, a ketone, an amine, a hydrocarbon, a phenol, an organic solvent, and a bleach.

7. The composition of claim 1, wherein the supercritical fluid further comprises at least one of nitrogen or carbon dioxide in a supercritical state.

8. The composition of claim 1, wherein the composition consists essentially of the colorant dissolved, absorbed or suspended in the supercritical fluid comprising the noble gas.

9. A method of producing a coloring composition, comprising:
    forming a supercritical fluid by increasing at least one of a pressure and a temperature of a noble gas; and
    combining a colorant with the supercritical fluid.

10. The method of claim 9, wherein the noble gas comprises at least one of helium, argon, krypton, neon, xenon, and radon.

11. The method of claim 9, wherein combining a colorant with the supercritical fluid comprises mixing a hydrocarbon with the supercritical fluid at a pressure and temperature sufficient to form a supercritical mixture of the noble gas and the hydrocarbon.

12. The method of claim 9, wherein combining a colorant with the supercritical fluid comprises cycling the pressure of the noble gas to enhance dissolution, solubility, or absorption of the colorant in the supercritical fluid.

13. The method of claim 9, wherein further comprising combining the supercritical fluid with at least one of carbon dioxide, oxygen, nitrogen, water, an alcohol, an amine, a ketone, an organic solvent, and a pH adjuster.

14. The method of claim 9, wherein forming a supercritical fluid by increasing at least one of a pressure and a temperature of a noble gas comprises increasing the pressure of the noble gas to reach a supercritical point.

15. A method of coloring an article, comprising:
    combining a colorant with a noble gas in a supercritical state to form a coloring composition; and
    subjecting the article to the coloring composition to color the article.

16. The method of claim 15, wherein combining a colorant with a noble gas in a supercritical state comprises combining the colorant with at least one of helium, argon, krypton, neon, xenon, and radon in the supercritical state.

17. The method of claim 15, wherein combining a colorant with a noble gas in a supercritical state comprises dissolving the colorant into a supercritical noble gas to form the coloring composition.

18. The method of claim 15, further comprising combining at least one additional substance with the coloring composition, the additional substance comprising at least one of carbon dioxide, oxygen, nitrogen, water, an alcohol, an aldehyde, an amine, a ketone, a hydrocarbon, a phenol, an organic solvent, and a bleach.

19. The method of claim 15, further comprising reducing at least one of a pressure and a temperature of the coloring composition to separate the noble gas from remaining colorant and coloring byproducts.

20. The method of claim 15, further comprising cycling at least one of a pressure and a temperature of the noble gas while subjecting the article to the coloring composition.

\* \* \* \* \*

UNITED STATES PATENT AND TRADEMARK OFFICE
CERTIFICATE OF CORRECTION

| | | |
|---|---|---|
| PATENT NO. | : 8,192,507 B1 | Page 1 of 1 |
| APPLICATION NO. | : 13/413490 | |
| DATED | : June 5, 2012 | |
| INVENTOR(S) | : Carlson et al. | |

It is certified that error appears in the above-identified patent and that said Letters Patent is hereby corrected as shown below:

In Column 1, Lines 8-9, delete "2010. Now a" and insert -- 2010, now --, therefor.

In Column 5, Line 48, delete " 1,3(2H)-dione " and insert -- 1,3(2H)-dione --, therefor.

In Column 5, Line 57, delete "methyl)amino)" and insert -- methylamino) --, therefor.

In Column 5, Line 58, delete "-dione)" and insert -- -dione --, therefor.

In Column 13, Line 4, delete "vessel in 202" and insert -- vessel 202 --, therefor.

In Column 18, Line 61, delete "in'coloring," and insert -- in coloring, --, therefor.

In Column 19, Line 45, delete "least," and insert -- least --, therefor.

In Column 26, Line 48, delete "a'" and insert -- a --, therefor.

Signed and Sealed this
Second Day of October, 2012

David J. Kappos
*Director of the United States Patent and Trademark Office*